United States Patent [19]

Hendi

[11] Patent Number: 5,785,750
[45] Date of Patent: Jul. 28, 1998

[54] 1,4-DIKETO-3,6-DIARYLPYROLO[3,4-C] PYRROLE

[75] Inventor: Shivakumar B. Hendi, Newark, Del.

[73] Assignee: Ciba Specialty Chemicals Corporation, Tarrytown, N.Y.

[21] Appl. No.: 938,656

[22] Filed: Sep. 26, 1997

Related U.S. Application Data

[60] Provisional application No. 60/027,470 Sep. 26, 1996.
[51] Int. Cl.⁶ .......................... C07D 471/04; C09B 48/00
[52] U.S. Cl. .......................... 106/497; 544/125; 544/333; 544/361
[58] Field of Search .................. 546/56, 57; 106/497

[56] References Cited

U.S. PATENT DOCUMENTS

| | | | |
|---|---|---|---|
| 4,585,878 | 4/1986 | Jost et al. | 548/453 |
| 4,791,204 | 12/1988 | Jost et al. | 548/101 |
| 4,931,566 | 6/1990 | Surber et al. | 548/453 |
| 5,527,922 | 6/1996 | Zambounis et al. | 548/453 |

*Primary Examiner*—Fiona T. Powers
*Assistant Examiner*—Laura L. Stockton
*Attorney, Agent, or Firm*—George R. Dohmann; Kevin T. Mansfield

[57] ABSTRACT

Pyrrolopyrrole derivatives of the formula (I)

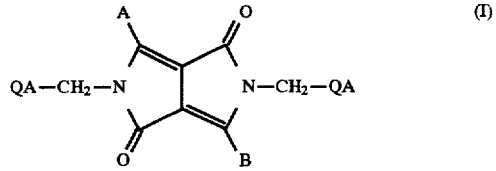

wherein QA is a quinacridone radical are disclosed. The inventive pyrrolopyrrole derivatives show excellent rheology enhancing properties for pigment dispersions, especially those containing quinacridones, DPPs and their solid solution pigments.

21 Claims, No Drawings

1,4-DIKETO-3,6-DIARYLPYROLO[3,4-C]PYRROLE

This application claims the benefit under 35 U.S.C. 119(e) of U.S. Provisional application No. 60/027,470, filed Sep. 26, 1996.

SUMMARY

The present invention relates to derivatives of 1,4-diketo-3,6-diarylpyrrolo[3,4-c]pyrrole pigments, pigment compositions containing the new derivatives and to the use of the new derivatives to improve the rheology of a pigment dispersion in a high-molecular-weight organic material and/or the coloristic characteristics of an automotive finish.

BACKGROUND 3,6-Diaryl-1,4-diketopyrrolopyrrole (DPP) compounds are well-known as important organic pigments. Generally, these pigments are described by the formula

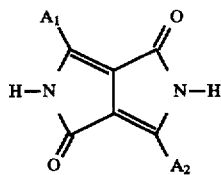

wherein $A_1$ and $A_2$ are aryl radicals.

U.S. Pat. No. 4,585,878 discloses N-substituted derivatives of the diaryldiketopyrrolopyrrole pigments wherein the N-substituent does not confer solubility in water. According to U.S. Pat. No. 4,585,878, the disclosed derivatives are useful as polymer soluble dyes or as pigments.

Rheology-improving agents for organic pigments reduce the viscosity of a dispersion of the organic pigment in a high-molecular-weight organic material. Some compounds capable of functioning as rheology-improving agents for organic pigments are known. For example, phthalimidomethylquinacridone, quinacridone monosulfonic acid salts, especially the aluminum salt, the dimethylaminopropylsulfonamide derivative of quinacridone and pyrrazolylmethylquinacridone are known rheology improving agents for organic pigments.

The present invention relates to a new class of rheology-improving agents for organic pigments; the pyrrolopyrrole derivatives of the formula (I)

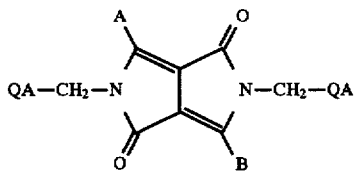

wherein QA is a quinacridone radical and A and B are aryl radicals. As rheology-improving additives for organic pigments, especially quinacridones, DPPs and their solid solution pigments, the inventive pyrrolopyrrole derivatives provide excellent rheology enhancing properties, but do not adversely impact on the coloristc and/or hiding properties of the pigment composition to which they are added.

DETAILED DESCRIPTION

The present invention relates to pyrrolopyrrole derivatives of the formula (I)

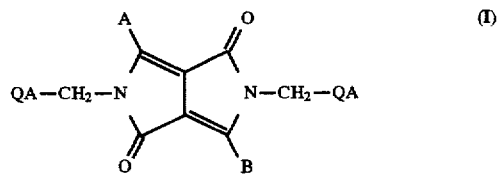

wherein A and B are identical or different aryl radicals, and QA is a quinacridone radical; which pyrrolopyrrole derivative is substituted by from 0 to 6 moles of —$SO_3M$ per mole of the pyrrolopyrrole derivative; wherein M is hydrogen or a metal or ammonium cation.

Preferably, the pyrrolopyrrole derivative is substituted with from 0 to 2 moles of —$SO_3M$ per mole of DPP derivative, most preferably 0 to 0.75 moles of —$SO_3M$ per mole of DPP derivative. A number of important pyrrolopyrrole derivatives contain virtually no —$SO_3M$.

A and B as aryl radicals include both aromatic and heteroaromatic radicals.

Radicals which are particularly suitable as A and B include radicals of the formula

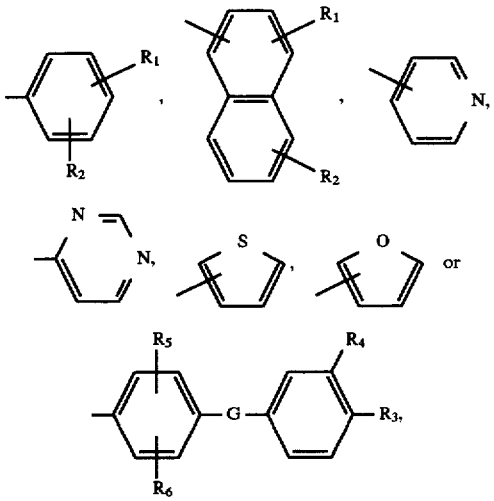

wherein
$R_1$ and $R_2$ are each independently of the other hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_1$–$C_{18}$alkoxycarbonyl, $C_1$–$C_{18}$alkylaminocarbonyl, —CN, —$NO_2$, trifluoromethyl, $C_5$–$C_6$cycloalkyl, —C=N—($C_1$–$C_{18}$alkyl), phenyl,

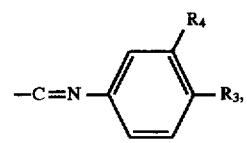

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl.

G is —$CH_2$—, —$CH(CH_3)$—, —$C(CH_3)_2$—, —CH=N—, —N=N—, —O—, —S—, —SO—, —$SO_2$—, —CONH— or —$NR_7$—.

$R_3$ and $R_4$ are each independently of the other hydrogen, halogen, $C_1$–$C_6$alkyl, $C_1$–$C_{18}$ alkoxy or —CN. $R_5$ and $R_6$ are independently of the other hydrogen, halogen or $C_1$–$C_6$alkyl, and $R_7$ is hydrogen or $C_1$–$C_6$alkyl.

In particular, A and B are each a group of formula

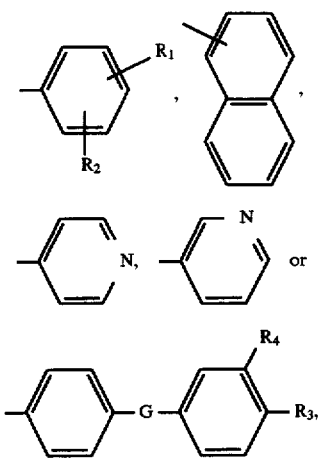

wherein
R₁ and R₂ are each independently of the other hydrogen, chloro, bromo, C₁–C₄alkyl, C₁–C₆alkoxyl, C₁–C₆alkylamino, phenyl or CN, G is —O—, —NR₇—, —N=N— or —SO₂—, R₃ and R₄ are hydrogen, and R₇ is hydrogen, methyl and ethyl, and more particularly A and B are each a group of formula

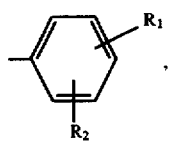

wherein R₁ and R₂ are each independently of the other hydrogen, methyl, tert-butyl, chloro, bromo, phenyl or CN. At least one of R₁ and R₂ is preferably hydrogen. Most preferably, at least one of R₁ and R₂ is hydrogen and the other is in the 3- or 4-position of the phenyl ring.

QA is preferably a quinacridone radical of the formula (II)

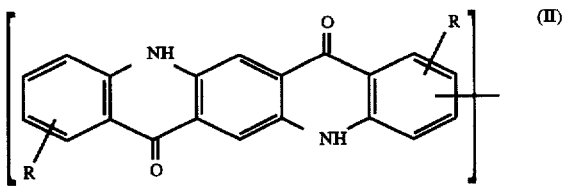

wherein each R is a customary substituent; preferably in the 2 and 9 or 4 and 11 positions. Preferably, each R is independently hydrogen, halogen, carboxyl, unsubstituted C₁–C₆ alkyl, C₁–C₆ alkyl which is substituted by halogen, unsubstituted C₁–C₆ alkoxy, or C₁–C₆ alkoxy which is substituted by halogen.

Preferably, QA is a quinacridone radical derivable from quinacridone, 2,9-dichloroquinacridone, 4,11-dichloroquinacridone, 2,9-dimethylquinacridone, 4,11-dimethylquinacridone, 2,9-difluoroquinacridone. Thus, preferred QA substituents are quinacridone radicals of formula (II) wherein each R is hydrogen, Cl, F or —CH₃. Preferably, if both R substituents are not hydrogen, both R substituents are the same and selected from the group consisting of Cl, F or —CH₃ and most preferably in the 2 and 9 or 4 and 11 positions. Alternatively, both R substituents are hydrogen.

Especially important compounds are those wherein A and B are identical and are selected from the group consisting of phenyl, 4-methylphenyl, 4-tert-butylphenyl, 4-chlorophenyl, 4-bromophenyl and biphenyl-1-yl (4-phenyl-phenyl); especially those compounds wherein both R substituents on the QA radical of formula (II) are hydrogen.

The most important compounds are those pyrrolopyrrole derivatives of formula (I) wherein A and B are each a group of formula

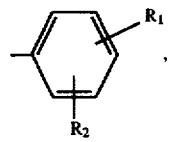

wherein R₁ and R₂ are each independently of the other hydrogen, methyl, tert-butyl, chloro, bromo, phenyl or CN; and QA is a radical of the formula

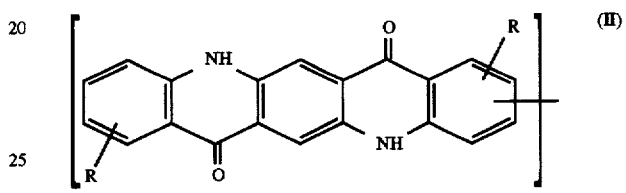

wherein the R substituents are hydrogen, 2,9- or 4,11-dichloro, 2,9- or 4,11-difluoro or 2,9- or 4,11-dimethyl.

Preferences discussed above for the pyrrolopyrrole derivatives relate to all other aspects of this invention.

The pyrrolopyrrole derivatives of the present invention are especially suitable for use as rheology-improving agents for organic pigments. As a rheology-improving agent for organic pigments, the inventive pyrrolopyrrole derivatives function to reduce the viscosity of a dispersion of the organic pigment in a high-molecular-weight organic material, such as a coating composition, for example, a water-borne or solvent-borne automotive paint.

Thus, another aspect of this invention relates to pigment compositions which comprise an organic pigment and a pyrrolopyrrole derivative of formula (I). Preferably, the pigment composition contains from 0.1 to 20 percent by weight of the pyrrolopyrrole derivative. Most preferably, the pigment composition contains from 1 to 10 percent by weight of the pyrrolopyrrole derivative.

The organic pigment is an azo, azomethine, anthraquinone, phthalocyanine, perinone, perylene, 1,4-diketo-3,6-diarylpyrrolo[3,4-c]pyrrole, thioindigo, isoindoline, isoindolinone, quinacridone, flavanthrone, indanthrone, anthrapyrimidine and quinophthalone pigments, in particular a 1,4-diketo-3,6-diarylpyrrolo[3,4-c]pyrrole or a quinacridone pigment; or a mixture thereof.

Important pigment compositions according to the present invention are those which contain a 1,4-diketo-3,6-diarylpyrrolo[3,4-c]pyrrole pigment or a quinacridone pigment as the organic pigment, including their solid solutions, and a pyrrolopyrrole derivative of the formula (I).

The inventive pigment compositions especially include those containing a 1,4-diketo- 3,6-diarylpyrrolo[3,4-c] pyrrole pigment selected from the group consisting of unsubstituted 1,4-diketo-3,6-diphenylpyrrolo[3,4-c]pyrrole, 1,4-diketo-3,6-di(3- or 4-chlorophenyl)pyrrolo[3,4-c] pyrrole, 1,4-diketo-3,6-di(3,4-dichlorophenyl)pyrrolo[3,4-c]pyrrole, 1,4-diketo-3,6-di(3-cyanophenyl)pyrrolo[3,4-c] pyrrole, 1,4-diketo-3,6-di(4-tert-butylphenyl)pyrrolo[3,4-c] pyrrole, 1,4-diketo-3,6-di(4-methylphenyl)pyrrolo[3,4-c] pyrrole, and 1,4-diketo-3,6-di(biphenyl-1-yl)pyrrolo[3,4-c] pyrrole, and a pyrrolopyrrole derivative of formula (I).

In addition, the inventive pigment compositions especially include those containing a quinacridone pigment selected from the group consisting of unsubstituted quinacridone, 2,9- and 4,11-dimethylquinacridone, 2,9- and 4,11-dichloroquinacridone and 2,9- and 4,11-difluoroquinacridone and a pyrrolopyrrole derivative of formula (I).

Especially important pigment compositions are those containing a 1,4-diketo-3,6-diarylpyrrolo[3,4-c]pyrrole pigment selected from the group consisting of unsubstituted 1,4-diketo-3,6-diphenylpyrrolo[3,4-c]pyrrole and 1,4-diketo-3,6-di(4-tert-butylphenyl)pyrrolo[3,4-c]pyrrole in combination with a pyrrolopyrrole derivative of formula (I).

Although the pigment compositions of the present invention can consist of only the organic pigment and the pyrrolopyrrole derivative, the pigment compositions generally contain customary additives, such as texture improving agents, light stabilizers and especially a second rheology-improving agent. In this application, the expression "pigment composition" means a formulation which is to be dispersed in a high-molecular-weight organic material that is composed of the pigment, the pyrrolopyrrole derivatives and any optional additives.

Useful light stabilizers are U.V. light absorbers, for example, benzotriazoles or hindered amine light stabilizers (HALS).

Texture-improving agents are especially useful as an additional component which can improve the properties of the pigment compositions. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines such as lauryl amine, or stearylamine. In addition, polyols, such as aliphatic 1,2-diols or polyvinyl alcohol, and ethoxylated fatty alcohols, epoxidized soya bean oil, waxes, resin acids and resin acid salts are suitable texture-improving agents. Rosin acids and rosin acid salts are especially suitable texture-improving agents. In general, the inventive pigment compositions contain from 0 to 20 percent by weight of the texture improving agent, preferably 0.5 to 10 percent by weight.

Agents useful as the second rheology-improving agent in the present pigment compositions include quinacridone derivatives, such as, quinacridone sulfonic acid, or a salt thereof, especially the aluminum salt, or pyrazolylmethylquinacridone, or other pyrrolopyrrole (DPP) derivatives, such as, a DPP sulfonic acid, or salt thereof, or a DPP derivative of the formula DPP-CH$_2$-DPP-CH$_2$-DPP, wherein DPP is a radical derived from a diketopyrrolopyrrole pigment which is prepared by methods analogous to those used to prepare the QA-CH$_2$-DPP-CH$_2$-QA derivatives which are the subject of the present application. If the pigment composition includes a second rheology-improving agent, the combined parts by weight of the pyrrolopyrrole derivative of formula (I) and the second rheology-improving agent are preferably in the range from 0.2 to 20 parts by weight per part of the pigment; most preferably from 2 to 10 parts per part of the pigment.

As discussed above, the presence of an inventive pyrrolopyrrole derivative in a dispersion of an organic pigment in a high-molecular-weight organic material effectively reduces the viscosity of the dispersion. Thus, the present invention further relates to a method of reducing the viscosity of a dispersion of an organic pigment in a high-molecular-weight organic material which comprises incorporating an effective viscosity-reducing amount of a pyrrolopyrrole derivative of formula (I) into the dispersion.

The pyrrolopyrrole derivative of formula (I) is added to the dispersion on its own, or, preferably, as a component of a pigment composition.

Preferably, the pyrrolopyrrole derivative of formula (I) is present in the dispersion in an amount in the range from 0.1 to 20 parts by weight per part of the pigment in the dispersion. Preferably, the pyrrolopyrrole derivative of formula (I) is present in the dispersion in an amount in the range from 0.2 to 10 parts by weight per part of the pigment in the dispersion. If the pyrrolopyrrole derivative of formula (I) is combined with a second rheology-improving agent, the combined parts by weight of the pyrrolopyrrole derivative of formula (I) and the second rheology-improving agent are preferably in the range from 0.1 to 20 parts by weight per part of the pigment in the dispersion; most preferably from 0.2 to 10 parts per part of the pigment in the dispersion.

The high-molecular-weight organic materials are, for example, cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

The dispersions especially contain a high-molecular-weight organic material which is useful for heat-curable or cross-linked coatings, for example chemically-reactive coatings, including stoving finishes which contain the customary binders and which are reactive at high temperature. Examples of the high-molecular-weight organic materials which are used in such coatings include acrylic, alkyd, epoxy, phenolic, melamine, urea, polyester, polyurethane, blocked isocyanate, benzoguanamine or cellulose ester resins, or combinations thereof. The pigmented, high-molecular-weight organic materials prepared according to the present process are also useful as air-drying or physically-drying coatings, for example, conventional lacquers such as those used in the cosmetics industry as nail varnishes, for example nitrocellulose lacquers.

The present process is particularly suitable for reducing the viscosity of dispersions containing high-molecular-weight organic materials conventionally employed for finishes in the automobile industry, especially acrylic/melamine resin, alkyd/melamine resin or thermoplastic acrylic resin systems, as well as in aqueous-based coating systems.

The use of many of the known viscosity-reducing agents for pigment dispersions often results in loss of saturation when the pigment dispersion is applied as the basecoat in a basecoat/clearcoat automotive finish. However, the use of the present pyrrolopyrrole derivatives of formula (I) as viscosity-reducing agents suprisingly does not result in a significant loss of saturation when the pigment dispersion is applied as the basecoat in a basecoat/clearcoat automotive finish, indeed in some instances the saturation of the finish is increased by the presence of the pyrrolopyrrole derivative of formula (I).

In this application, the expression "automotive finish" is used to describe finishes typically used for automobiles, such as waterborne and solventborne basecoat/clearcoat finishes. Such finishes are used for numerous applications other than for automobiles, such as other motor vehicles, bicycles, and appliances.

The present pyrrolopyrrole derivatives are easily prepared by a process which comprises a reaction wherein a 1,4-diketo-3,6-diarylpyrrolo[3,4-c]pyrrole of the formula

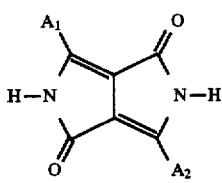

wherein $A_1$ and $A_2$ are aryl radicals, is reacted in a first step with formaldehyde to yield a sulfonated or non-sulfonated intermediate of the formula

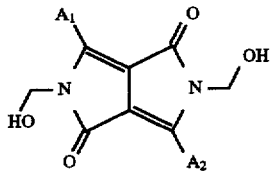

(II)

which intermediate reacts in a second step with 2 moles of a quinacridone compound to yield the pyrrolopyrrole derivative of formula (I).

The first step is preferably carried out by adding the 1,4-diketo-3,6-diarylpyrrolo[3,4-c]pyrrole to a solution of paraformaldehyde in concentrated sulfuric acid, preferably having a $H_2SO_4$ concentration greater than 90 percent by weight, most preferably above 95 percent by weight.

In general, the stoichiometric amount of formaldehyde is used in the first step. Thus, the molar ratio of the first 1,4-diketo-3,6-diarylpyrrolo[3,4-c]pyrrole to the formaldehyde during the first step is preferably 1:2.

After step (a) is complete, the resulting intermediate is reacted with two moles of the quinacridone compound to yield the pyrrolopyrrole derivative of formula (I).

Preferably, both steps are carried out at a temperature of from 20° to 100° C. If a high degree of sulfonation is desired, the process is carried out at higher temperatures, for example above 40° C. If it is desirable to have a low degree of sulfonation, the reaction is maintained at a lower temperature, preferably 40° C. or below.

After the reaction is complete, the pyrrolo[3,4-c]pyrrole derivative of formula (I) is isolated by procedures conventionally used in the art for isolating 1,4-diketo-3,6-diarylpyrrolo[3,4-c]pyrroles, in particular by pouring the sulfuric acid solution into ice water, maintaining the temperature below 10° C. and stirring the resulting aqueous slurry for about 1 hour, followed by filtration, washing and drying to yield the 1,4-diketo-3,6-diarylpyrrolo[3,4-c] pyrrole derivative in solid form.

The following examples further describe the embodiments of the invention, but do not limit the scope of the invention. In the examples, all parts are by weight unless otherwise indicated. All viscosity measurements are taken at room temperature.

EXAMPLE 1

250 grams of concentrated sulfuric acid (96%) are added to a one liter four-necked flask equipped with a stirrer, a thermometer and a reflux condenser with a drying tube. 14.4 grams (0.05 moles) of 1,4-diketo-3,6-diphenylpyrrolo[3,4-c]pyrrole (unsubstituted DPP) are then added in small portions maintaining the pot temperature below 40° C. After stirring for 0.5 hours, 3.1 grams (0.103 moles) of paraformaldehyde are then introduced into the reaction mixture and the temperature rises to about 45° C. The reaction is stirred at 40±2° C. for 1 hour. 31.2 grams of quinacridone (0.1 moles) of quinacridone is then added maintaining the temperature below 45° C. The reaction mixture is stirred at 45±2° C. for 3 hours and then poured into ice water, filtered, washed with water until the filtrate is acid free, dried and pulverized to yield the compound of the formula

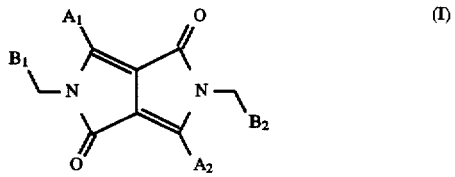

(I)

wherein $A_1$ and $A_2$ are each phenyl and $B_1$ and $B_2$ are quinacridinyl radicals. The product analyzes $C_{60}H_{35.5}N_6O_6 \cdot (SO_3H)_{0.5}$.

EXAMPLE 2

250 grams of concentrated sulfuric acid (96%) are added to a one liter four-necked flask equipped with a stirrer, a thermometer and a reflux condenser with a drying tube. 14.4 grams (0.05 moles) of 1,4-diketo-3,6-diphenylpyrrolo[3,4-c]pyrrole (unsubstituted DPP) are then added in small portions maintaining the pot temperature below 25° C. After stirring for 1 hour, 3.1 grams (0.103 moles) of paraformaldehyde are then introduced into the reaction mixture followed by 31.2 grams of quinacridone (0.1 moles) and the maintaining the temperature below 25° C. The reaction mixture is stirred at 25±2° C. for 3 hours and then poured into ice water, filtered, washed with water until the filtrate is acid free, dried and pulverized to yield the compound of the formula

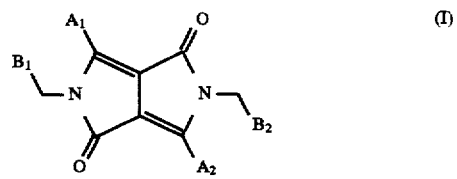

(I)

are each phenyl and $B_1$ and $B_2$ are quinacridinyl radicals. The product analyzes $C_{60}H_{36}N_6O_6$.

EXAMPLE 3

400 grams of concentrated sulfuric acid (96%) are added to a one liter four-necked flask equipped with a stirrer, a thermometer and a reflux condenser with a drying tube. 14.4 grams (0.05 moles) of 1,4-diketo-3,6-diphenylpyrrolo[3,4-c]pyrrole (unsubstituted DPP) are then added in small portions maintaining the pot temperature below 25° C. After stirring for 1 hour, 3.1 grams (0.103 moles) of paraformaldehyde are then introduced into the reaction mixture followed by 38.1 grams of 4,11-dichloroquinacridone (0.1 moles) and the maintaining the temperature below 45° C. The reaction mixture is stirred at 45±2° C. for 2.5 hours and then poured into ice water, filtered, washed with water until the filtrate is acid free, dried and pulverized to yield the compound of the formula

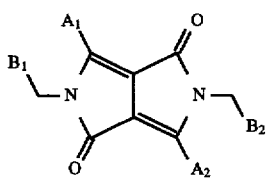

are each phenyl and $B_1$ and $B_2$ are 4,11-dichloroquinacridinyl radicals. The product analyzes $C_{60}H_{34}C_{12}N_6O_6$.

EXAMPLE 4

250 grams of concentrated sulfuric acid (96%) are added to a one liter four-necked flask equipped with a stirrer, a thermometer and a reflux condenser with a drying tube. Quinacridone (31.2 grams, 0.1 moles) is added in small portions followed by 14.4 grams (0.05 moles) of 1,4-diketo-3,6-diphenylpyrrolo[3,4-c]pyrrole (unsubstituted DPP) maintaining the pot temperature between 40°–45° C. After stirring for 0.5 hours, 3.1 grams (0.103 moles) of paraformaldehyde are then introduced into the reaction mixture and the temperature rises to about 50° C. The reaction is stirred at 45±3° C. for 1 hour and then poured into ice water, filtered, washed with water until the filtrate is acid free, dried and pulverized to yield the compound of the formula

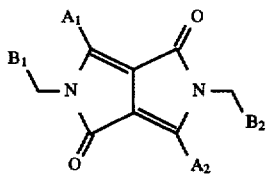

wherein $A_1$ and $A_2$ are each phenyl and $B_1$ and $B_2$ are quinacridinyl radicals. The product analyzes $C_{60}H_{35.5}N_6O_6 \cdot (SO_3H)_{0.5}$.

EXAMPLES 5–12

The following compounds, wherein A, B and R are defined according to formulae (I) and (II), are prepared according to the procedures of Examples 1–4 by substituting the appropriate DPP and quinacridone compounds:

| Ex | A | B | R |
|---|---|---|---|
| 5 | phenyl | phenyl | 2,9-diCl |
| 6 | phenyl | phenyl | 2,9-diMe |
| 7 | phenyl | phenyl | 4,11-diMe |
| 8 | 4-tBuphenyl | 4-tBuphenyl | 2,9-diCl |
| 9 | 4-Cl-phenyl | 4-Cl-phenyl | H |
| 10 | 4-Mephenyl | 4-Mephenyl | H |
| 11 | 4-tBuphenyl | 4-tBuphenyl | H |
| 12 | 4-Mephenyl | 4-Mephenyl | 2,9-diCl |

EXAMPLE 13

A pigment composition prepared by adding a surface treating agent which consists of the pyrrolopyrrole derivative of formula (I), alone, or combined with a second rheology-improving agent, to an aqueous suspension of the pigment, filtering and washing to yield the pigment composition. The viscosity of a dispersion of the pigment composition in a commercial high solids solventborne paint formulation is measured at 50 rpm.

| Pyrrolopyrrole Derivative | Second Rheology Improving Agent | Pigment | % by Weight Pigment in Dispersion | P/B | Millbase Viscosity (Brookfield) |
|---|---|---|---|---|---|
| none | none | 1 | 10 | 0.5 | 1610 |
| 8% Example 2 | none | 1 | 10 | 0.5 | 63 |
| 4% Example 2 | 4% QMA | 1 | 10 | 0.5 | 62 |
| 4% Example 10 | 4% PMQA | 2 | 10 | 0.5 | 600 |
| 4% Example 5 | 4% PMQA | 2 | 10 | 0.5 | 708 |
| 4% Example 8 | 4% PMQA | 2 | 10 | 0.5 | 648 |
| 4% Example 11 | 4% PMQA | 2 | 10 | 0.5 | 474 |
| 4% Example 1 | 4% QMA | 2 | 10 | 0.5 | 736 |
| none | none | 3 | 10 | 0.5 | 1910 |
| 4% Example 1 | 4% QMA | 3 | 10 | 0.5 | 1210 |

QMA = quinacridone sulfonic acid, aluminum salt
PMQA = pyrrazolylmethylquinacridone
1 = a ternary solid solution of dichloro DPP/DPP/2,9-dichloroQA (48/32/20)
2 = binary solid solution of dichloro DPP/2,9-dichloroQA (60/40)
3 = 1,4-diketo-3,6-di(biphenyl-1-yl)pyrrolopyrrole

EXAMPLE 14

A solid solution of dichloro DPP/dichloroquinacridone (40/60) is prepared by milling a mixture of the two individual components on a roller for 24 hours and stirring the mill powder with 2% sulfuric acid for 2 hours at 90° C., and then filtering and washing the resulting pigment slurry. The resulting presscake is reslurried in water and combined with the rheology-improving agent(s) specified in the table below, filtered, washed, dried and pulverized to yield a treated pigment. A pigment dispersion containing 10% pigment and 30% solids at a pigment/binder ratio of 0.5 is prepared by combining the treated pigment with acrylourethane resin, dispersant resin and solvent and milling with grinding media for 64 hours. The Brookfield viscosity of the resulting pigment dispersion is reported in the following table.

| Pyrrolopyrrole Derivative | Second Rheology Improving Agent | Millbase Viscosity (Brookfield) |
|---|---|---|
| 4% Example 1 | 4% PQMA | 566 |
| 4% Example 10 | 4% PQMA | 600 |
| 4% Example 11 | 4% PQMA | 474 |
| 4% Example 12 | 4% PQMA | 708 |
| 4% Example 8 | 4% PQMA | 648 |

EXAMPLE 15

Automotive finishes are obtained by spray painting aluminum panels with a metallic or mica paint formulation prepared by conventional methods and pigmented with the above described pigment compositions. The coatings exhibit attractive, intense colors with excellent two-tone, high gloss and distinctness of image.

I claim:
1. A pyrrolopyrrole derivative of the formula (I)

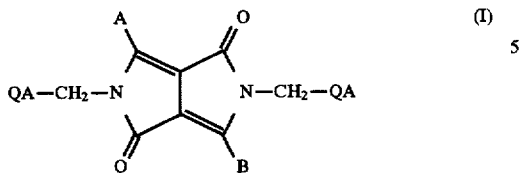

wherein A and B are identical or different aryl radicals, and QA is a quinacridone radical; which pyrrolopyrrole derivative is substituted by from 0 to 6 moles of —SO₃M per mole of the pyrrolopyrrole derivative; wherein M is hydrogen or a metal or ammonium cation.

2. A pyrrolopyrrole derivative of claim 1 which contains from 0 to 0.75 moles of —SO$_3$M per mole of pyrrolopyrrole derivative.

3. A pyrrolopyrrole derivative of claim 2 wherein A and B are each independently a radical of the formula

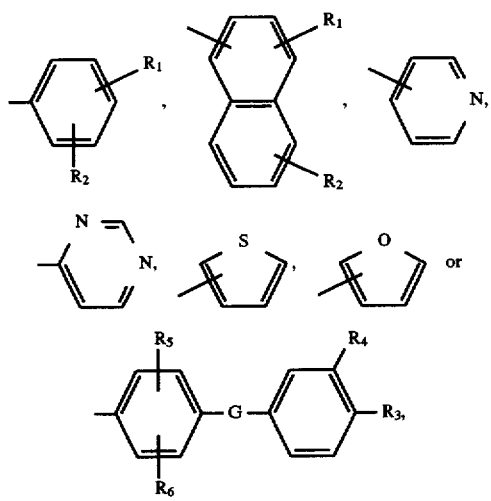

wherein
R$_1$ and R$_2$ are each independently of the other hydrogen, halogen, C$_1$-C$_{18}$alkyl, C$_1$-C$_{18}$alkoxy, C$_1$-C$_{18}$alkylmercapto, C$_1$-C$_{18}$alkylamino, C$_1$-C$_{18}$alkoxycarbonyl, C$_1$-C$_{18}$alkylaminocarbonyl, —CN, —NO$_2$, trifluoromethyl, C$_5$-C$_6$cycloalkyl, —C=N—(C$_1$-C$_{18}$alkyl), phenyl,

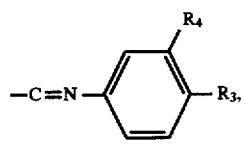

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl.
G is —CH$_2$—, —CH(CH$_3$)—, —C(CH$_3$)$_2$—, —CH=N—, —N=N—, —O—, —S—, —SO—, —SO$_2$—, —CONH— or —NR$_7$—,
R$_3$ and R$_4$ are each independently of the other hydrogen, halogen, C$_1$-C$_6$alkyl, C$_1$-C$_{18}$alkoxy or —CN, R$_5$ and R$_6$ are each independently of the other hydrogen, halogen or C$_1$-C$_6$alkyl, and R$_7$ is hydrogen or C$_1$-C$_6$ alkyl.

4. A pyrrolopyrrole derivative of claim 3, wherein A and B are each a group of formula

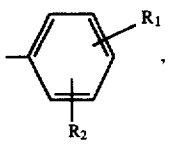

wherein R$_1$ and R$_2$ are each independently of the other hydrogen, methyl, tert-butyl, chloro, bromo, phenyl or CN.

5. A pyrrolopyrrole derivative of claim 4 wherein at least one of R$_1$ and R$_2$ is hydrogen.

6. A pyrrolopyrrole derivative of claim 5 wherein at least one of R$_1$ and R$_2$ is hydrogen and the other is in the 3- or 4-position of the phenyl ring.

7. A pyrrolopyrrole derivative of claim 1 wherein A and B are phenyl.

8. A pyrrolopyrrole derivative of claim 1 wherein QA is a quinacridone radical of the formula (II)

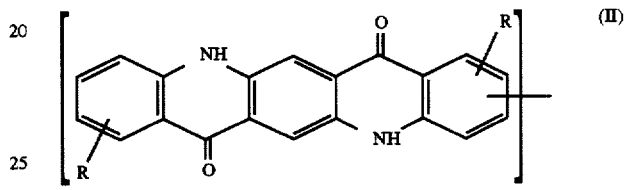

wherein each R is independently hydrogen, halogen, carboxyl, unsubstituted C$_1$-C$_6$ alkyl, C$_1$-C$_6$ alkyl which is substituted by halogen, unsubstituted C$_1$-C$_6$ alkoxy, or C$_1$-C$_6$ alkoxy which is substituted by halogen.

9. pyrrolopyrrole derivative claim 8 wherein each R is hydrogen, Cl, F or —CH$_3$.

10. A pyrrolopyrrole derivative claim 9 wherein both of the R substituents are the same and selected from the group consisting of Cl, F and CH$_3$.

11. A pyrrolopyrrole derivative of claim 10 wherein the R substituents are in the 2 and 9 or 4 and 11 positions.

12. A pyrrolopyrrole derivative of claim 9 wherein each R is hydrogen.

13. A pyrrolopyrrole derivative of claim 8 wherein A and B are identical and are selected from the group consisting of phenyl, 4-methylphenyl, 4-tert-butylphenyl, 4-chlorophenyl, 4-bromophenyl and biphenyl-1-yl.

14. A pyrrolopyrrole derivative of claim 1 wherein A and B are each a group of formula

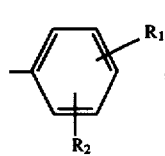

wherein R$_1$ and R$_2$ are each independently of the other hydrogen, methyl, tert-butyl, chloro, bromo, phenyl or CN; and QA is a radical of the formula

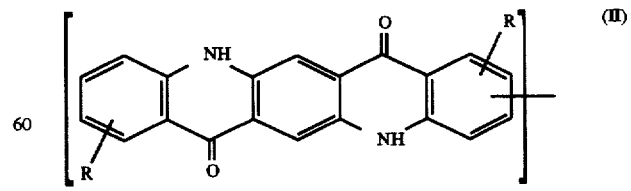

wherein the R substituents are hydrogen, 2,9- or 4,11-dichloro, 2,9- or 4,11-dimethyl or 2,9-difluoro.

15. A pigment composition which comprises an organic pigment and a pyrrolopyrrole derivative of formula (I) according to claim 1.

16. A pigment composition of claim 15 which comprises from 1 to 10 percent by weight of the pyrrolopyrrole derivative of formula (I).

17. A pigment composition of claim 15 which further comprises a light stabilizer, a texture-improving agent or a second rheology-improving agent.

18. A pigment composition of claim 15 wherein the organic pigment is a 1,4-diketo-3,6-diarylpyrrolo[3,4-c]pyrrole pigment or a quinacridone pigment.

19. A method of reducing the viscosity of a dispersion of an organic pigment in a high-molecular-weight organic compound, which comprises incorporating an effective viscosity-reducing amount of a pyrrolopyrrole derivative of formula (I) according to claim 1 into the dispersion.

20. A method of claim 19 wherein the high-molecular-weight organic material is selected from cellulose ethers, cellulose esters, polyurethanes, polyesters, polycarbonates, polyolefins, polystyrene, polysulfones, polyamides, polycycloamides, polyimides, polyethers, polyether ketones, polyvinyl halides, polytetrafluoroethylene, acrylic and methacrylic polymers, rubber, silicone polymers, phenol/formaldehyde resins, melamine, formaldehyde resins, urea/formaldehyde resins, epoxy resins and diene rubbers or copolymers thereof.

21. A method of preparing an basecoat/clearcoat finish, which comprises the step of applying a dispersion comprising an organic pigment and an effective viscosity-reducing amount of a pyrrolopyrrole derivative of formula (I) according to claim 1 in a high-molecular-weight organic compound to a substrate.

* * * * *